US010304124B2

(12) United States Patent
Kleinhandler et al.

(10) Patent No.: US 10,304,124 B2
(45) Date of Patent: May 28, 2019

(54) SYSTEMS, METHODS, SERVERS, AND CLIENTS FOR INVENTORY EXCHANGE

(71) Applicants: Lisa J. Kleinhandler, Canfield, OH (US); Christine A. Young, Canfield, OH (US)

(72) Inventors: Lisa J. Kleinhandler, Canfield, OH (US); Christine A. Young, Canfield, OH (US)

(*) Notice: Subject to any disclaimer, the term of this patent is extended or adjusted under 35 U.S.C. 154(b) by 53 days.

(21) Appl. No.: 15/671,759

(22) Filed: Aug. 8, 2017

(65) Prior Publication Data

US 2017/0337619 A1  Nov. 23, 2017

Related U.S. Application Data

(63) Continuation of application No. 14/656,104, filed on Mar. 12, 2015, now Pat. No. 9,760,944, which is a (Continued)

(51) Int. Cl.
| | | |
|---|---|---|
| *G06Q 30/00* | (2012.01) | |
| *G06Q 30/06* | (2012.01) | |
| *G06Q 10/08* | (2012.01) | |

(52) U.S. Cl.
CPC ....... *G06Q 30/0641* (2013.01); *G06Q 10/087* (2013.01); *G06Q 30/0635* (2013.01)

(58) Field of Classification Search
CPC .............. G06Q 30/00; G06Q 30/0601; G06Q 30/0613; G06Q 30/0621; G06Q 30/0641
See application file for complete search history.

(56) References Cited

U.S. PATENT DOCUMENTS

| | | | |
|---|---|---|---|
| 7,107,226 B1* | 9/2006 | Cassidy | G06Q 30/0625 705/26.62 |
| 7,337,166 B2* | 2/2008 | Bailey | G06F 17/30398 |

(Continued)

OTHER PUBLICATIONS

Quester, Pascale G., and Justin Smart. "The influence of consumption situation and product involvement over consumers' use of product attribute." Journal of consumer marketing 15.3 (1998): 220-238. (Year: 1998).*

(Continued)

*Primary Examiner* — Christopher B Seibert
(74) *Attorney, Agent, or Firm* — Walter Haverfield LLP; James J. Pingor

(57) ABSTRACT

According to the embodiments described herein, an inventory exchange client can include one or more processors communicatively coupled to client memory, a client communication module, and a display. The memory can store machine readable instructions. The one or more processors can execute the machine readable instructions to store inventory information on the client memory. The inventory information can include a product instance. Updated inventory information can be received via the client communication module. The product instance can be updated according to the updated inventory information. The dynamic web page can be populated with identification objects. The identification objects can be associated with the inventory information. A product order request can be transmitted to an inventory exchange server. The product order request can be encoded to initiate a product transaction via the inventory exchange server.

17 Claims, 5 Drawing Sheets

Related U.S. Application Data continuation-in-part of application No. 14/304,092, filed on Jun. 13, 2014, now abandoned.

(56) References Cited

U.S. PATENT DOCUMENTS

| | | | | |
|---|---|---|---|---|
| 2001/0032170 | A1* | 10/2001 | Sheth | G06Q 10/0631 705/37 |
| 2002/0055887 | A1* | 5/2002 | Seguin | G06Q 30/06 705/26.8 |
| 2003/0014317 | A1* | 1/2003 | Siegel | G06Q 10/087 705/22 |
| 2003/0220830 | A1* | 11/2003 | Myr | G06Q 10/06 705/14.54 |
| 2004/0243505 | A1* | 12/2004 | Sweeting | G06Q 40/00 705/37 |
| 2004/0254950 | A1* | 12/2004 | Musgrove | G06F 17/30327 |
| 2005/0177474 | A1* | 8/2005 | Ma | G06Q 30/06 705/30 |
| 2006/0074780 | A1* | 4/2006 | Taylor | G06Q 30/0601 705/35 |
| 2006/0218162 | A1* | 9/2006 | Keil | G06F 17/50 |
| 2007/0088625 | A1* | 4/2007 | Fish | G06Q 30/02 705/26.7 |
| 2007/0094056 | A1* | 4/2007 | Kang | G06Q 10/02 705/5 |
| 2007/0179868 | A1* | 8/2007 | Bozym | G06Q 30/02 705/26.1 |
| 2008/0052372 | A1* | 2/2008 | Weber | G06F 17/30265 709/217 |
| 2009/0138817 | A1* | 5/2009 | Oron | G06F 17/30905 715/788 |
| 2009/0150262 | A1* | 6/2009 | Mizhen | G06Q 20/12 705/26.1 |
| 2010/0205551 | A1* | 8/2010 | Underwood | G06F 17/3089 715/760 |
| 2011/0047014 | A1* | 2/2011 | De Angelo | G06F 3/0482 705/14.4 |
| 2011/0161384 | A1* | 6/2011 | Wykes | G06Q 30/0603 707/822 |
| 2011/0238484 | A1* | 9/2011 | Toumayan | G06Q 30/02 705/14.39 |
| 2012/0109713 | A1* | 5/2012 | Wilhite | G06Q 30/0609 705/7.32 |
| 2012/0215665 | A1* | 8/2012 | Marshall | G06Q 30/02 705/27.1 |
| 2012/0226620 | A1* | 9/2012 | Junger | G06Q 10/0833 705/304 |
| 2012/0265648 | A1* | 10/2012 | Jerome | G06Q 10/10 705/26.62 |
| 2013/0041778 | A1* | 2/2013 | Nativ | G06Q 30/0633 705/26.62 |
| 2013/0151481 | A1* | 6/2013 | Andrasick | G06F 17/30864 707/692 |
| 2015/0134477 | A1 | 5/2015 | Ortolani | |

OTHER PUBLICATIONS

Yazdanshenas, Amir Reza, and Leon Moonen. "Fine-grained change impact analysis for component-based product families." Software Maintenance (ICSM), 2012 28th IEEE International Conference on. IEEE, 2012. (Year: 2012).*

Written Opinion of the International Searching Authority for International Patent Application No. PCT/US2015/020185 dated Jun. 30, 2015, 8 pages.

International Search Report for International Patent Application No. PCT/US2015/020185 dated Jun. 30, 2015, 3 pages.

International Preliminary Report on Patentability for International Patent Application No. PCT/US2015/020185 dated Dec. 15, 2016, 9 pages.

* cited by examiner

SYSTEMS, METHODS, SERVERS, AND CLIENTS FOR INVENTORY EXCHANGE

CROSS-REFERENCE TO RELATED APPLICATIONS

This application is a continuation of U.S. patent application Ser. No. 14/656,104 filed on Mar. 12, 2015, which is a continuation-in-part of U.S. patent application Ser. No. 14/304,092 filed Jun. 13, 2014, which are both hereby incorporated by reference in their entirety.

FIELD OF INVENTION

The present disclosure relates to E-Commerce. More specifically, the present disclosure relates to a system and method for facilitating efficient product search and identification.

BACKGROUND

E-commerce platforms enable retailers, manufactures, suppliers, wholesalers, distributors, and others involved in selling products to electronically present a catalogue of the products to buyers. An electronic catalogue eliminates the need for a buyer to browse through a physical catalogue or through physical inventory of products. For example, using an example user interface 100 of an e-commerce platform, as illustrated in FIG. 1, a consumer may be required to select one or more categories 102 and subcategories 104 of products before being presented with a list of products 106 within the selected subcategory. The list of products 106 may be relatively limited such that the products can be presented to the consumer within the user interface 100 as displayed in FIG. 1. The list of products 106 may also be relatively large such that the user interface 100 must provide the consumer with methods that allow the consumer to navigation through the list of products 106. For example, the e-commerce platform can enable the consumer to scroll through the list 106 of products or provide the consumer with navigation controls 108 to move to additional pages to view all products in a sub-category.

In some industries, however, a product or family of products may include a large variety of models, shapes, sizes, colors, etc. For example, in the fastener industry, a single type of screw such as a hex cap screw may be available in numerous diameters and in numerous lengths. Moreover, the screw may be available in several different types of materials such as steel, bronze, etc. and in several types of finishes such as galvanized, nickel-plated, etc. Thus, a consumer may be presented with, thousands of combinations and options for a single type of screw. In addition, a seller of fasteners may offer many different types of screws, all of which may be available in a different diameters, lengths, materials, and finishes. Accordingly, because of the large number of available products, it may be inefficient and time consuming for a consumer to scroll through a long list of products or navigate to multiple pages on an e-commerce platform. In addition, it may be difficult, confusing, and error-prone for a consumer to search for and identify a desired product by scrolling through long lists and navigating to multiple pages presenting a product category.

SUMMARY

An ecommerce system for identifying a product having a combination of attributes. The ecommerce system includes at least one processor, at least one computer-readable tangible storage device, and program instructions stored on the at least one storage device for execution by the at least one processor. The program instructions include first program instructions configured to receive data indicative of a selected product. The program instructions further include second program instructions configured to retrieve product data based on selected product. The program instructions further include third program instructions configured to generate a product grid corresponding to the selected product. The product grid includes a plurality of rows, each corresponding to a valise of a first attribute. The product grid further includes a plurality of columns, each corresponding to a value of a second attribute. The product grid further includes a plurality of cells formed by the intersection of the plurality of rows and the plurality of columns, wherein each of the plurality of cells represents the product having a value of the first attribute that corresponds to the intersecting row and a value of the second attribute that corresponds to the intersecting column.

In a method for identifying a product having a combination of attributes, a computer receives data indicative of a selected product, retrieves product data based on selected product, and generates a product grid corresponding to the selected product. The product grid includes a plurality of rows, each corresponding to a value of a first attribute. The product grid further includes a plurality of columns, each corresponding to a value of a second attribute. The product grid further includes a plurality of cells formed by the intersection of the plurality of rows and the plurality of columns, wherein each of the plurality of cells represents the product having a value of the first attribute that corresponds to the intersecting row and a value of the second attribute that corresponds to the intersecting column.

A computer program product for identifying a product having a combination of attributes includes at least one computer-readable tangible storage device and program instructions stored on the at least one storage device. The program instructions include first program instructions configured to receive data indicative of a selected product. The program instructions further include second program instructions configured to retrieve product data based on selected product. The program instructions further include third program instructions configured to generate a product grid corresponding to the selected product. The product grid includes a plurality of rows, each corresponding to a value of a first attribute. The product grid further includes a plurality of columns, each corresponding to a value of a second attribute. The product grid further includes a plurality of cells formed by the intersection of the plurality of rows and the plurality of columns, wherein each of the plurality of cells represents the product having a value of the first attribute that corresponds to the intersecting row and a value of the second attribute that corresponds to the intersecting column.

In one embodiment, an inventory exchange client can include one or more processors communicatively coupled to client memory, a client communication module, and a display. The memory can store machine readable instructions. The one or more processors can execute the machine readable instructions to store inventory information on the client memory. The inventory information can include a product instance. Updated inventory information can be received via the client communication module. The product instance can be updated according to the updated inventory information. A dynamic web page can be provided upon the display and can be populated with identification objects. The identification objects can be associated with the inventory information. Purchase selection input can be received via one of the identification objects. The purchase selection input can be indicative of selection of the product instance. A product order request can be transmitted to an inventory exchange server. The product order request can be encoded to initiate a product transaction via the inventory exchange server according to the purchase selection input.

In another embodiment, an inventory exchange client can include one or more processors communicatively coupled to client memory, a client communication module, and a display. The memory can store machine readable instructions. The one or more processors can execute the machine readable instructions to receive a data store via the client communication module. The data store can include inventory information. The data store can be stored to the client memory. A dynamic web page can be provided upon the display. The dynamic web page can include a product selection object. Selection input can be received via the product selection object. Matching product instances can be selected, based upon the selection input, from the inventory information of the data store of the client memory. The dynamic web page can be populated with identification objects. The identification objects can be associated with the matching product instances. Purchase selection input can be received via one of the identification objects. The purchase selection input can be indicative of selection of one of the matching product instances. A product order request can be transmitted to an inventory exchange server. The product order request can be encoded to initiate a product transaction via the inventory exchange server according to the purchase selection input.

In another embodiment, an inventory exchange client can include one or more processors communicatively coupled to client memory, a client communication module, and a display. The memory can store machine readable instructions. The one or more processors can execute the machine readable instructions to store a data store to the client memory. A dynamic web page can be provided upon the display. The dynamic web page can be populated with identification objects. The identification objects can be associated with product instances of the inventory information. Updated inventory information can be received via the client communication module. The product instance can be updated according to the updated inventory information. Purchase selection input can be received via one of the identification objects. The purchase selection input can be indicative of selection of one the product instances. A product order request can be transmitted to an inventory exchange server. The product order request can be encoded to initiate a product transaction via the inventory exchange server according to the purchase selection input.

According to any of the ecommerce systems, methods, computer program products, or inventory exchange clients provided herein, the one or more processors can execute machine readable instructions to provide an asynchronous web portal that updates the dynamic web page by accessing resources stored on the client memory and resources of the inventory exchange server.

According to any of the ecommerce systems, methods, computer program products, or inventory exchange clients provided herein, the one or more processors can execute machine readable instructions to receive a request to apply access rules data via the client communication module. The request can be encoded to indicate the access rules data. Portions of the inventory information can be selectively hidden from the dynamic web page. The portions can be hidden according to the access rules data.

According to any of the ecommerce systems, methods, computer program products, or inventory exchange clients provided herein, the one or more processors execute machine readable instructions to receive save selection input via the identification objects. The save selection input can be indicative of save selection of the product instance. A save product request can be transmitted to the inventory exchange server. The save product request can be encoded to associate the product instance with authentication information of an entity.

According to any of the ecommerce systems, methods, computer program products, or inventory exchange clients provided herein, the one or more processors execute machine readable instructions to organize the identification objects in a product grid. Grid data can be transmitted to the inventory exchange server. The grid data can be encoded to duplicate the product grid. The grid data can be received via the client communication module. A reproduced product grid can be provided according to the grid data, upon a subsequent load of the dynamic web page. Alternatively or additionally, the reproduced product grid can include reproduced identification objects that are encoded to indicate updated information. Alternatively or additionally, the product instance can be a hierarchical data type and can be defined by attributes. The identification objects can be organized according to the attributes of associated product instances.

According to any of the ecommerce systems, methods, computer program products, or inventory exchange clients provided herein, the identification objects can be encoded to indicate availability of products corresponding to the inventory information.

According to any of the ecommerce systems, methods, computer program products, or inventory exchange clients provided herein, the dynamic web page can include dynamic objects that are updated while portions of the dynamic web page remain static.

According to any of the ecommerce systems, methods, computer program products, or inventory exchange clients provided herein, the inventory information can correspond to corresponding inventory information of the inventory exchange server.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals.

DETAILED DESCRIPTION

Figure 1:
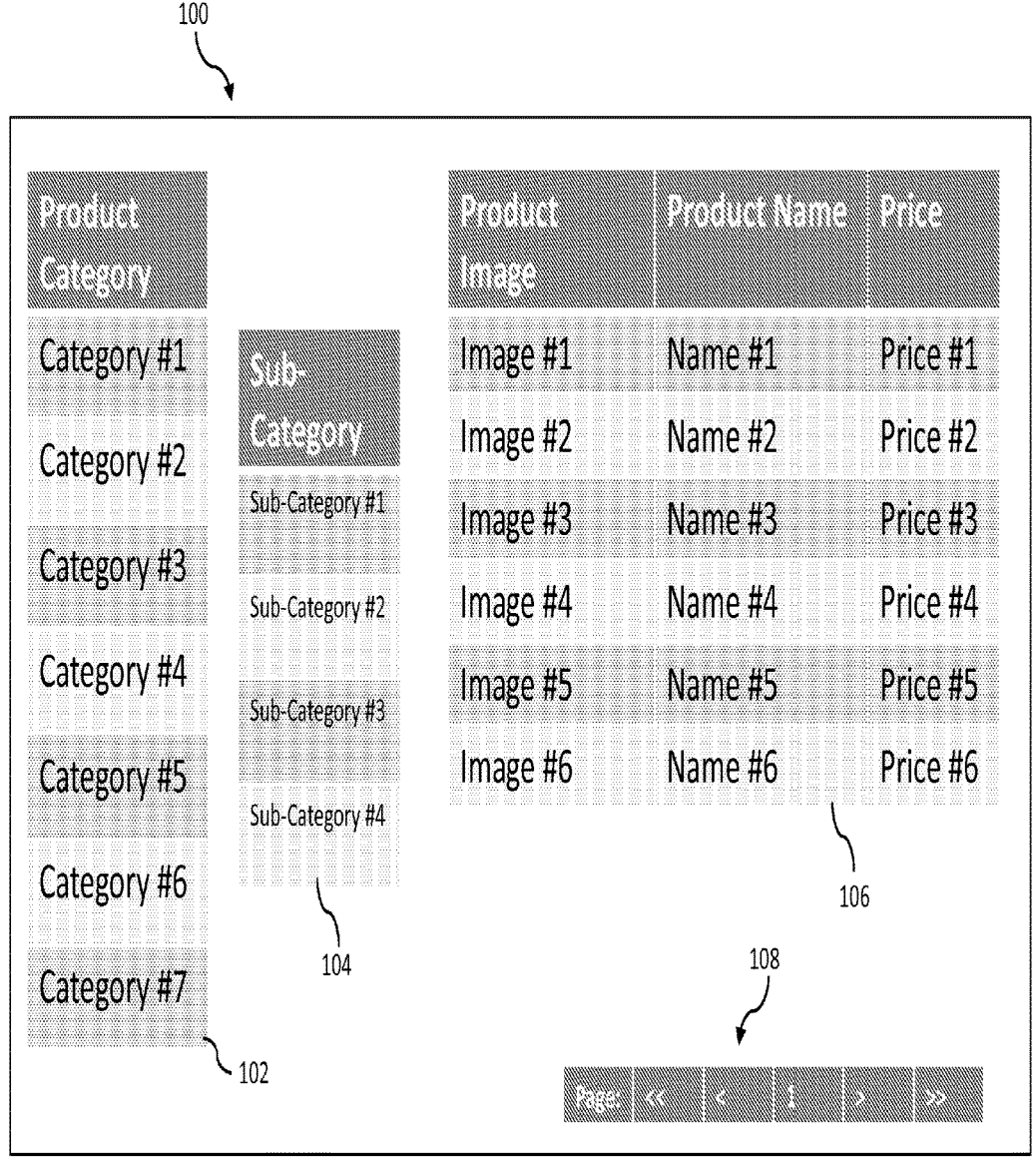
FIG. 1 illustrates an example user interface of a known e-commerce platform.
Figure 2:
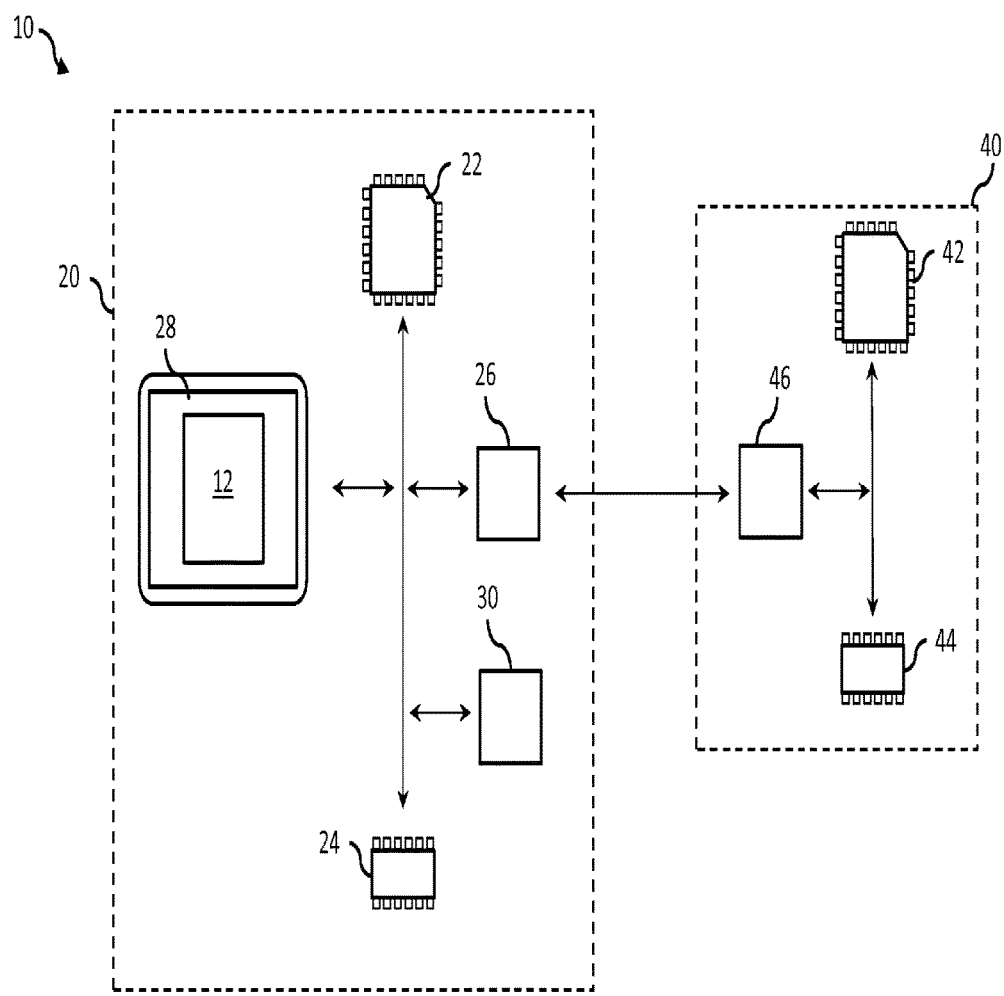
FIG. 2 schematically depicts a system for providing data to dynamic web pages via an inventory exchange server according to one or more embodiments shown and described.
Figure 3:
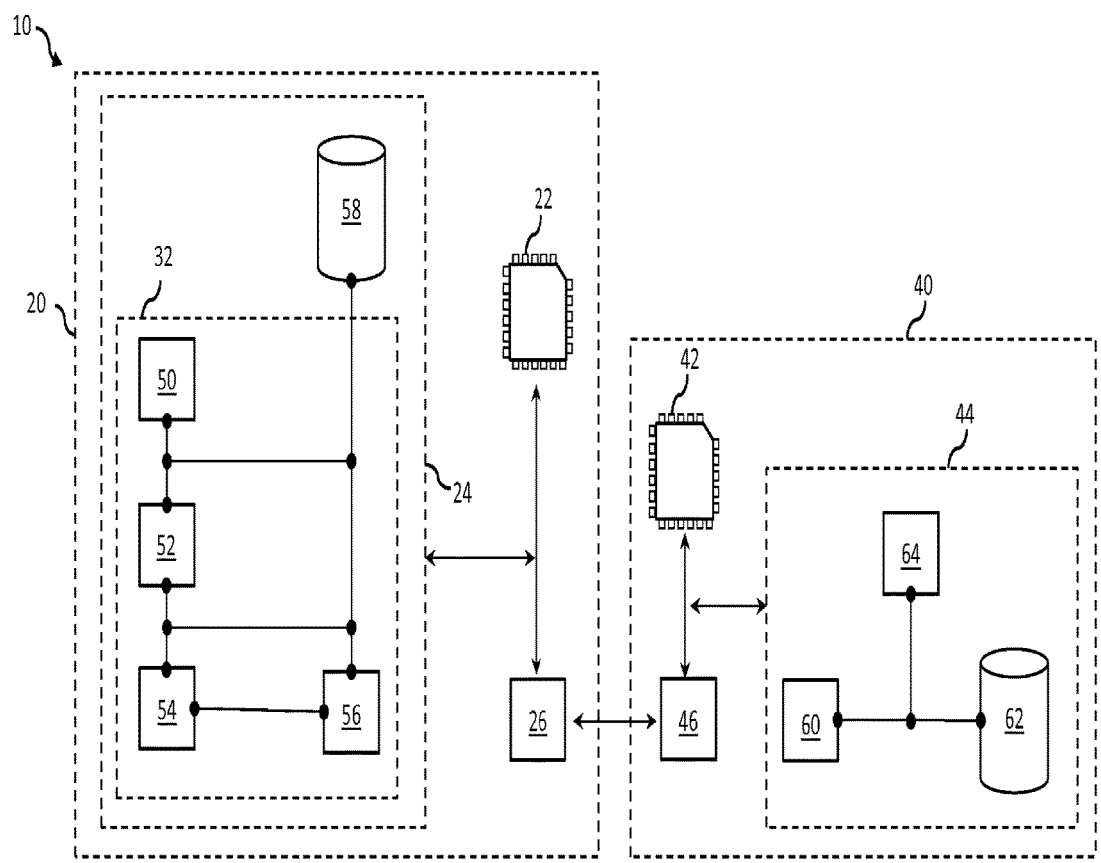
FIG. 3 schematically depicts a system for providing data to dynamic web pages via an inventory exchange server according to one or more embodiments shown and described.

FIGS. 2 and 3 generally depict an embodiment of a system 10 for providing data to dynamic web pages 12 via an inventory exchange client 20, where the inventory exchange server 40 includes a client memory 24. The system 10 can make use of the inventory exchange client 20 for launching an asynchronous web portal 32 that provides a dynamic web page 12. The asynchronous web portal 32 can access a data store 58 on the client memory 24 to populate the dynamic web page 12 and to facilitate a product transaction. Various embodiments of the system, inventory exchange clients, inventory exchange servers, and methods for inventory exchange are described in greater detail herein. For the purpose of defining and describing the present disclosure, the phrase "inventory exchange" can mean of or relating to devices that track, manage, or deliver goods from a first location to a second location.

FIG. 2 is a schematic illustration of a system 10 for providing data to a dynamic web page 12 via the inventory exchange client 20 that can facilitate the exchange of inventory, as described herein. The system 10 can comprise an inventory exchange client 20 configured to launch an asynchronous web portal 32 (as illustrated in FIG. 3) and provide a dynamic web page 12. The inventory exchange client 20 can comprise one or more processors 22 for executing machine readable instructions to perform functions according to the methods described herein. As used herein, the term "processor" can mean any device capable of executing machine readable instructions. Accordingly, each processor can be an integrated circuit, a microchip, or any other device capable of implementing logic. Specific examples of the one or more processors 22 can include a graphics processing unit, a central processing unit, or the like. Various machines can be utilized to provide the inventory exchange client 20 without departing from the scope of the embodiments described herein such as, for example, a smart phone, a tablet, a laptop computer, desktop computer, or the like.

The inventory exchange client 20 can comprise client memory 24 communicatively coupled to the one or more processors 22 (generally depleted as double arrowed lines). The client memory 24 described herein may be RAM, ROM, a flash memory, a hard drive, or any device capable of storing machine readable instructions. It is noted that the functions, modules, and processes described herein can be provided as machine readable instructions stored on the client memory 24 and executed by the one or more processors 22. Additionally, it is noted that the phrase "communicatively coupled," as used herein, can mean that components are capable of exchanging data signals with one another such as, for example, electrical signals via conductive medium, electromagnetic signals via air, optical signals via optical waveguides, and the like.

The machine readable instructions can be provided in any programming language of any generation, (e.g., 1GL, 2GL, 3GL, 4GL, or 5GL) such as, e.g., machine language that may be directly executed by the processor, or assembly language, object-oriented programming (OOP), scripting languages, microcode, etc., that may be compiled or assembled into machine readable instructions and stored on a machine readable medium. Alternatively, the functions, modules, and processes described herein may be written in a hardware description language (HDL), such as logic implemented via either a field-programmable gate array (FPGA) configuration or an application-specific integrated circuit (ASIC), and their equivalents. Accordingly, the functions, modules, and processes described herein may be implemented in any conventional computer programming language, as pre-programmed hardware elements, or as a combination of hardware and software components.

Referring still to FIG. 2, the inventory exchange client 20 can comprise a client communication module 26 communicatively coupled to the one or more processors 22 for communicatively coupling the inventory exchange client 20 to another device via a network such as, for example, a wide area network, a local area network, personal area network, or any combination thereof. Accordingly, the client communication module 26 can be configured to communicate, i.e., send, receive, or both, data signals via any wired or wireless communication protocol. For example, the client communication module 26 can comprise an antenna, a modem, LAN port, wireless fidelity (Wi-Fi) card, WiMax card, near-field communication hardware, satellite communication, hardware, or the like. Accordingly, the inventory exchange client 20 can be communicatively coupled to a network via wires, via a wide area network, via a focal area network, via a personal area network, via a satellite network, or the like. Suitable local area networks can comprise wired Ethernet and/or wireless technologies such as, for example, Wi-Fi. Suitable personal area networks can comprise wireless technologies such as, for example, IrDA, BLUETOOTH, Wireless USB, Z-WAVE, ZIGBEE, or the like. Alternatively or additionally, suitable personal area networks may include wired computer buses such as, for example, USB and FIRE WIRE. In some embodiments, the client communication module 26 can comprise radio frequency hardware (RF hardware) for communicatively coupling a cellular network. Suitable cellular networks include, but are not limited to, technologies such as LTE, WiMAX, UMTS, CDMA, and GSM. Thus, any components of the inventory exchange client 20 can utilize one or more network components to communicate signals via the Internet or World Wide Web. It is noted that the term "signal," as used herein, can mean a waveform (e.g., electrical, optical, magnetic, or electromagnetic), such as DC, AC, sinusoidal-wave, triangular-wave, square-wave, and the like, capable of traveling through a medium.

The inventory exchange client 20 can comprise a display 28 communicatively coupled to the one or more processors 24 for providing a user interface via the transmission of optical signals. In some embodiments, the display 28 can comprise a plurality of pixels that can decode a signal provided by the one or more processors 22 to selectively illuminate pixels to provide a user interface such as, but not limited to, a web page. The display 28 can comprise light emitting diodes (LED or OLED), liquid crystal display (LCD), liquid crystal on silicon (LCOS), or the like.

The inventory exchange client 20 can comprise one or more input device 30 for sensing user input and encoding the input into a signal indicative of the user input. Suitable examples of the one or more input device 30 include a keyboard, a mouse, a touch screen, a camera, a microphone, or the like. Accordingly, the display 28 can be configured to operate as a touch screen for accepting input via visual controls or objects. Accordingly, the display 28 can comprise an input device 30 configured as a touch detector such as, for example, a resistive sensor, capacitive sensor, or the like.

Referring still to FIG. 2, the system 10 can comprise an inventory exchange server 40 that facilitates the exchange of inventory, as described herein. The inventory exchange server 40 can comprise one or more processors 42 communicatively coupled to server memory 44. The one or more processors 42 can also be communicatively coupled to a server communication module 46, which can be configured like the client communication module 26 described above. It is noted that, while the inventory exchange server 40 is schematically depicted in FIG. 2 as being a single machine, each of the one or more processors 42, the server memory 44, and the server communication module 46 can be distributed amongst a plurality of machines that are communicatively coupled to one another. Accordingly, the inventory exchange server 40 can be scaled to include any number of machines suitable for meeting the demands of the server functions. In some embodiments, the one or more processors 42 can execute web server software provided as machine readable instructions such as, but not limited to, via storage on the server memory 44. Suitable web server software includes, but is not limited to, Apache HTTP Server, Internet Information Services, Nginx, Google Web Server, or the like. Accordingly, the inventory exchange server 40 can utilize a server operating system such as, for example, UNIX, Linux, BSD, Microsoft Windows, or the like.

Referring collectively to FIGS. 2 and 3, the inventory exchange client 20 and the inventory exchange server 40 can be communicatively coupled to provide the dynamic web page 12. Specifically, the client communication module 26 of the inventory exchange client 20 can be communicatively coupled to the server communication module 46 of the inventory exchange server 40. Accordingly, the client communication module 26 can send data signals to the inventory exchange server 40, and can receive data signals from the inventory exchange server 40. Likewise, the server communication module 46 can send data signals to the inventory exchange client 20, and can receive data signals from the inventory exchange client 20.

The asynchronous web portal 32 can be configured to communicate with resources hosted by the inventory exchange server 40 without altering the state of a web page provided upon the display 28 of the inventory exchange client 20 by the asynchronous web portal 32. In some embodiments, the asynchronous web portal 32 can comprise a request handler module 50 that provides the logic for responding to requests from resources of the asynchronous web portal 32. For example, the request handler module 50 can process and respond to requests from the asynchronous web portal 32. The request handler module 50 can manipulate data to provide the response to the dynamic web page 12, which can comprise, for example, HTML data, JSON data, XML data, or any other data needed.

In some embodiments, the asynchronous web portal 32 can comprise a script module 52 configured to interact with the request handler module 50. The script module 52 can be configured to communicate with the inventory exchange server 40 in the background without interfering with the state of the dynamic web page 12. The script module 52 can be implemented using any type of web enabled technology such as, but not limited to, JavaScript. In some embodiments, the script module 52 can be configured to communicate with the inventory exchange server 40 asynchronously. Accordingly, portions of the dynamic web page 12 can be updated using resources hosted by the inventory exchange server 40, while other portions of the dynamic web page 12 remain in an unchanged state. That is, full page reloads can be mitigated by updating dynamic objects of the dynamic web page 12. As is explained in greater detail below, the script module 52 can be configured to implement a framework that is configured to handle requests for both client-side components (e.g., components stored in the client memory 24) and server-side components (e.g., components stored in the server memory 44) such as, but not limited to, an Ajax framework. Thus, portions of the dynamic web page 12 can be updated using resources hosted by the inventory exchange client 20, while other portions of the dynamic web page 12 can remain unchanged.

In some embodiments, the asynchronous web portal 32 can comprise an API request module 54 for generating a query of resources according to the logic implemented by the script module 52. Accordingly, the query can define parameters that identify the resources to be interrogated by the asynchronous web portal 32. The query can furthermore define resource properties to be retrieved or manipulated. The API supports two request parameters, which are explained in the following sections, that enable the identification of resource properties that should be included in API responses.

Referring collectively to FIGS. 2 and 3, the asynchronous web portal 32 can comprise a communication module 56 for performing actions on resources according to the query. For example, the communication module 56 can utilize internet protocol request methods to perform actions on resources of the inventory exchange server 40. Specifically, in some embodiments, the actions of the communication module 56 can be performed according to Hypertext Transfer Protocol (HTTP) using request methods such as, for example, GET, POST, or the like. As is described in greater detail herein, the communication module 56 can be configured to perform actions upon resources of the inventory exchange client 20.

Referring again to FIG. 3, in some embodiments, the request handler module 50, the script module 52, the API request module 54, and the communication module 56 can be interconnected (generally indicated by lines with circular connectors) for inputting data, outputting data, or both. For example, each of the request handler module 50, the script module 52, the API request module 54, and the communication module 56 can be provided upon the client memory 24 as machine readable instructions. Alternatively or additionally, one or more portions of the request handler module 50, the script module 52, the API request module 54, and the communication module 56 can be provided as pre-programmed hardware elements or as a combination of hardware and software components, which can be incorporated in the one or more processors 24, the client communication module 26, or both.

According to the embodiments described herein, the inventory exchange server 40 can comprise an API module 60 that provides functions for performing actions on resources of the inventory exchange server 40. For example, the API module 60 can be configured to authorize access to resources of the inventory exchange server 40 such as a relational database 62, a controller module 64, or both. Accordingly, the API module 60 can implement access rules that enable the communication module 56 to perform actions using the relational database 62, the controller module 64, or both. In some embodiments, the API module 60 can utilize a standard to authorize such as, for example, OAuth, OAuth 2.0, OpenID or the like.

The relational database 62 of the inventory exchange server 40 can comprise a plurality of associated data instances that can be utilized as a shared resource hosted by the inventory exchange server. The relational database 62 can be implemented using a database system such as, for example, Oracle, MySQL, Microsoft SQL Server, PostgreSQL, IBM DB2, or the like. The associated data instances can define inventory information indicative of goods available for purchase from a supplier or retailer. Accordingly, the inventory information can be updated over time to reflect the goods on hand. It is noted that the term "associated," as used herein, can mean that multiple instances of data are linked in a manner that allows for the retrieval of each of the instances from information provided to one of the instances.

Referring again to FIG. 3, in some embodiments, the API module 60, the relational database 62, and the controller module 64 can be interconnected and configured to share data. For example, each of the API module 60, the relational database 62, and the controller module 64 can be provided upon the server memory 44 as machine readable instructions. Alternatively or additionally, one or more portions of the API module 60, and the controller module 64 can be provided as pre-programmed hardware elements or as a combination of hardware and software components, which can be incorporated in the one or more processors 42, the server communication module 46, or both.

Referring collectively to FIGS. 2 and 3, the controller module 64 of the inventory exchange server 40 can comprise a plurality of controllers invoked by the API module 60 to execute actions upon resources of the inventory exchange server 40. In some embodiments, the controller module 64 can comprise a frontend controller for providing data to the dynamic web page 12 via the asynchronous web portal 32. Alternatively or additionally, the controller module 64 can comprise an e-commerce controller for facilitating the purchase of goods via the dynamic web page 12. Alternatively or additionally, the controller module 64 can comprise an integration controller that is configured to provide a data store 58 comprising inventory information to the inventory exchange client 20. The integration controller can also be configured to provide updates to the data store 58 such that the inventory information of the data store 58 is consistent with the inventory information of the relational database 62.

Figure 4:
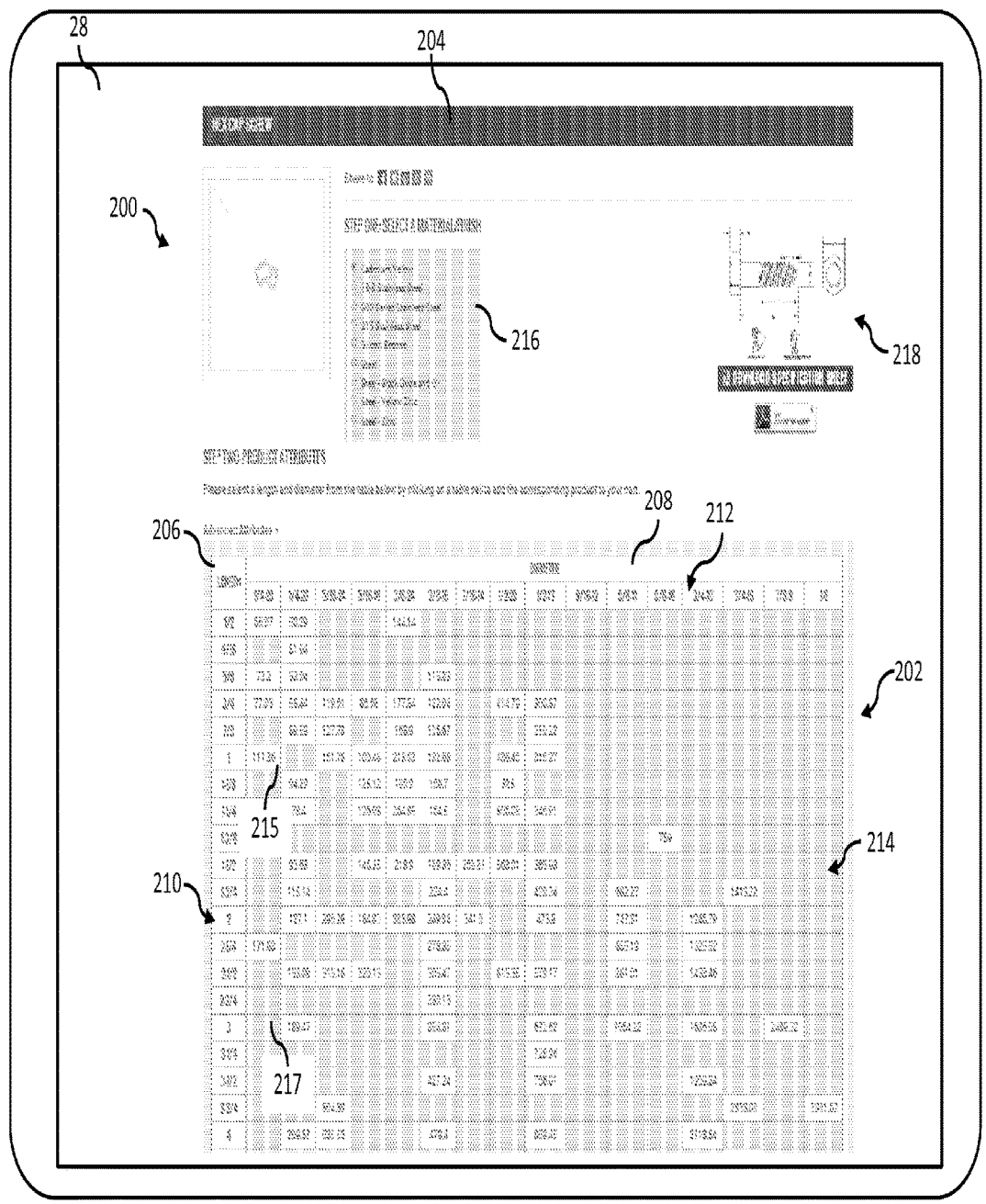
FIG. 4 schematically depicts a dynamic web page according to one or more embodiments shown and described.

Referring collectively to FIGS. 3 and 4, an embodiment of the dynamic web page 200 is schematically depicted. The dynamic web page 200 can be provided upon the display 28 to provide a user interface that facilitates efficient product search and identification for e-commerce. The dynamic web page 200 can comprise a product grid 202 that corresponds to a selected product category of the inventory information. The selected product category, such as hex cap screw, can be identified in a product label 204 of the dynamic web page. Specifically, the product label 204 can comprise a text description (e.g., name of a product category), an image corresponding to the product category, or both. In some embodiments, the selected product category can be selected using an interface provided by the controller module 64 of the inventory exchange server 40. For example, the frontend controller can be configured to pre-select the selected product category or the frontend controller can provide interface objects that receive input to select the preselected product category. Specifically, the selected product category can be selected from a list of product categories by receiving input on a product category name, by receiving input on a product category from a drop-down list, by receiving input on a check-box, or by receiving input on any other type of control object.

The product grid 202 can be configured to provide a summary of products that correspond to the selected product category. Each of the products can correspond to a product instance of inventory Information having a plurality of attributes. The product grid 202 can be configured to display a first attribute 206 of the product instance along the vertical axis and a second attribute 208 of the product instance along the horizontal axis. In the embodiment depicted in FIG. 4, the first attribute 206 can be length and the second attribute 208 can be diameter. It is noted that, while the attributes depicted in FIG. 4 correspond to length, diameter, and finish, the product instances described herein can comprise any attribute corresponding to a product such as, for example, height, weight color, material, or any other useful attribute of a product.

The product grid 202 can comprise multiple rows 210 each corresponding to a different value of the first attribute 206. The product grid 202 can comprise multiple columns 212 each corresponding to different value of the second attribute 208. It is noted that the product grid 202 can be sized to fit within a screen area of the display 208. However, it should be appreciated that product grid 202 can be scaled to include any suitable number of rows 210 and columns 212 corresponding to the product instances of the product category.

A plurality of cells 214 can be formed at each intersection of the rows 210 and columns 212. An identification object can be provided at each cell 214. The identification object can be associated with a product instance that corresponds to the selected product category, the first attribute 206 of the row 210, and the second attribute 206 of the column 212. Accordingly, the product instance associated with the identification object of a cell 214 can comprise a first attribute that matches a value of the first attribute 206 and a second attribute that matches a value of the second attribute 208. For example, an instance 215 of the cells 214 can be aligned with column 208 corresponding to a ¼-28 diameter attribute and a row 210 corresponding to a length of 1. The identification object can be associated with a product instance having a diameter attribute of ¼-28 and a length attribute of 1. Furthermore, the product instance can correspond to a product having matching attributes.

In some embodiments, the identification object of each cell 214 can be encoded to indicate the availability of a product. Specifically, the identification object of a cell corresponding to a product instance indicative of an available product can be encoded in a first manner. The identification object of a cell corresponding to a product instance indicative of an available product can be encoded in a second manner that is distinguishable visually from the first manner. Accordingly, the cells 214 can be utilized to indicate that a product is not available or not offered for sale. For example, an instance 217 of the cells 214 can be aligned with column 208 corresponding to a ¼-28 diameter attribute and a row 210 corresponding to a length of 3. The identification object of the instance 215 can be encoded to indicate that 1 inch long, ¼-28 hex cap screws are available for purchase. The identification object of the instance 21 can be encoded to indicate that 3 inch long, ¼-28 hex cap screws are not available for purchase. Accordingly, the identification objects of the cells 214 that can be differentiated to indicate availability and unavailability of corresponding products.

The differentiation may be encoded in any suitable manner. For example, identification objects corresponding to products that are available can be displayed in a first color, while identification objects corresponding to products that are not available can be displayed in a second color. Alternatively or additionally, the differentiation can be indicated symbolically, i.e., a symbol such as a red "x" or a green check mark may be used to make the distinction. Alternatively or additionally, the identification object can be encoded to reveal an attribute to make the distinction. For example, a price attribute (e.g., number corresponding to a particular currency) can be revealed by identification objects corresponding to available products, while the price attribute can be bidden by identification objects corresponding to unavailable products. Alternatively or additionally, the identification object can be encoded to indicate the quantity of corresponding products available in inventory. Alternatively or additionally, the identification object can be encoded to indicate a product serial number of available products. Alternatively or additionally, the identification object can be encoded to include an image of the product, or another graphic to indicate availability. For unavailable products, the identification object can be blank or encoded with no information.

Referring collectively to FIGS. 3 and 4, the dynamic web page 200 can comprise a product selection object 216 for receiving selection input indicative of a desire to select a selected attribute. In response to the selection input, the product selection object 216 can be configured to filter the product grid 202 according to the selected attribute. Accordingly, each of the cells 214 of the product grid can be associated with a matching product instance that comprises the selected attribute of the product selection object 216. In the embodiment depicted in FIG. 4, the product selection object 216 is configured to receive input indicative of a finish attribute. Accordingly, the product selection object 216 can enable a user to select a material or finish of matching product instances associated with the product grid 202. Specifically, as depicted in FIG. 4, the product selection object 216 can receive input indicative of material/finish of cadmium yellow, 18-8 stainless steel, 300 series stainless steel, 316 stainless steel, silicon bronze, steel, steel—black oxide and oil, steel—yellow zinc, and steel—zinc. The product selection object 216 can comprise any control such as, for example, a dropdown list, check-boxes, radio buttons, links, and other suitable interface for selecting an item from a group of items.

The asynchronous web portal 32 can be configured to provide the product grid 202 upon the dynamic web page 200 in response to input received by the product selection object 216. For example, the request handier module 50 of the asynchronous web portal 32 can receive the selected attribute of the product selection object 216 and a request for matching product instances of the inventory information. The API request module 54 can define a query for product instances of the inventory information that match the selected attribute. The communication module 56 can execute the query and access the data store 58 to retrieve the matching product instances. In some embodiments, the data store 58 can be stored in the client memory 24 (FIG. 2). Accordingly, the data store 58 can be recorded on the client memory 24, or preserved in the client memory 24.

The matching product instances can be provided to the scripting module 52, which can update the product grid 202 via the request handler module 50. Accordingly, the cells 214 can be updated such that the identification objects are associated with the matching product instances. Additionally, each of the identification objects can be encoded to be indicative of the associated product instance. Thus, the product grid 202 can be configured to display the matching product instances. The identification objects can also be arranged according to the first attribute 206 and the second attribute 208, as is described above.

In some embodiments, the product grid 202 can be configured to update automatically in accordance with the selected attribute of the product selection object 216. For example, as depicted in FIG. 4, the identification objects can be encoded and arranged according to a selected attribute of cadmium yellow. Should the product selection object 216 receive input indicative of a different selected attribute, the product grid 202 can be updated by the asynchronous web portal 32. In some embodiments, the asynchronous web portal 32 can be configured to utilize a default attribute in product selection object 216 and a pre-selected attribute, i.e., upon the initial load of the dynamic web page 200, the product, grid 202 can be provided, according in a predefined manner. It is noted that, while the product selection object 216 is described herein according to a particular attribute, the product selection object 216 can be configured to receive input indicative of any attribute or multiple attributes.

According to the embodiments described herein, the product grid 202 can provide a relatively large amount of product information in a relatively compact area within the display 208. Moreover, the identification objects can be encoded with information that can quickly communicate the inventory of products corresponding to the product instances of the inventory information. Thus, consumers can be provided with the capability to determine product availability without having to scroll through and navigate between large amounts of data spanning multiple pages or displays. Moreover, since the embodiments described herein can populate and arrange the product grid 202 according to any desired attribute, substitute products can be identified rapidly as like products are organized adjacent to one another.

Referring collectively to FIGS. 2-4, the identification object of each cell 214 can be configured to receive purchase selection input. Specifically, each of the identification objects can be provided as a control that accepts input indicative of selection of one the product instances. For example, the identification object can be associated with a product instance that indicates that a corresponding product is in stock. The identification object can receive input to initiate an inventory transaction involving the corresponding product. For example, the purchase selection input can be provided in any manner that is receivable by an input device 30 such as, but not limited to, a mouse-click upon an identification object of a cell 214. In some embodiments, a control can be launched by to receive additional purchase selection input such as, for example, a prompt, a popup window, a shopping cart object or other suitable interface for receiving input. Accordingly, the product selection input can be indicative of quantity, payment information, destination, or the like.

In response to the purchase selection input, the asynchronous web portal 32 can communicate with the inventory exchange server 40 to initiate a product transaction. For example, the request handier module 50 can process the purchase selection input and request the script module 52 to initiate the product transaction. The script module 52 can direct the API request module 54 to generate a query to resources of the inventory exchange server 40. Accordingly, the communication module 56 can transmit a product order request to the API module 60 of the inventory exchange server 40. The product order request can be encoded to initiate the product transaction according to the purchase selection input. Specifically, the product order request can be encoded to indicate the product instance identified by the purchase selection input. Additionally, the product order request can be encoded to request action by resources of the inventory exchange server 40, i.e., the product order request can be encoded to initiate a transaction. In some embodiments, the product order request can be encoded as a POST communication that identifies the e-commerce controller of the controller module 64.

The product order request can be received by the API module 60. The API module 60 can be configured to launch the e-commerce controller of the controller module 64 according to the product order request. The e-commerce controller can be configured to fulfill the product order request by launching a fulfillment process that causes the product corresponding to the product order request to be delivered to a destination associated with the product order request. Alternatively or additionally, the e-commerce controller can comprise a payment gateway configured to perform a financial transaction with a gateway of a financial institution. For example, the product order request can be encoded to provide payment information which can be communicated to gateway of the financial institution. In some embodiments, the payment information can be sent directly from the inventory exchange client 20 to the financial institution. The financial institution can then forward financial transaction details indicative of payment information, to the payment gateway of the e-commerce controller of the controller module 64. Alternatively or additionally, the payment information can be encrypted such as, for example, via Secure Socket Layer (SSL) encryption.

Referring again to FIGS. 3-4, the asynchronous web portal 32 can be configured to update the dynamic webpage 12 asynchronously. Specifically, the dynamic web page 12 can comprise dynamic objects that can be updated while portions of the dynamic web page 12 remain static. The dynamic objects can comprise the product grid 202, the product selection object 216, or both. Alternatively or additionally, the dynamic objects can comprise an information display object 218. The information display object 218, can be configured to display related to a product associated with an identification object of a cell 214. For example, when the identification object receives purchase selection input, the information display object 218, can be encoded to provide information associated with the product instance associated with the identification object. In some embodiments, information display object 218 can be linked, to a document containing suitable product information such as, for example, product specifications of the associated product instance.

Referring collectively to FIGS. 2-4, the asynchronous web portal 32 can be configured to handle requests for both client-side components and server-side components. In some embodiments, the dynamic objects can be configured to request information from the data store 58 which is stored on the client memory 24 of the inventory exchange client 20. For example, the product grid 202 can be associated with inventory information provided by the data store 58. Thus, the product grid 202 can be updated by accessing client-side components. Alternatively or additionally, the product grid 202 can be configured to access server-side components such as, for example, the frontend controller or the e-commerce controller of the controller module 64.

Figure 5:
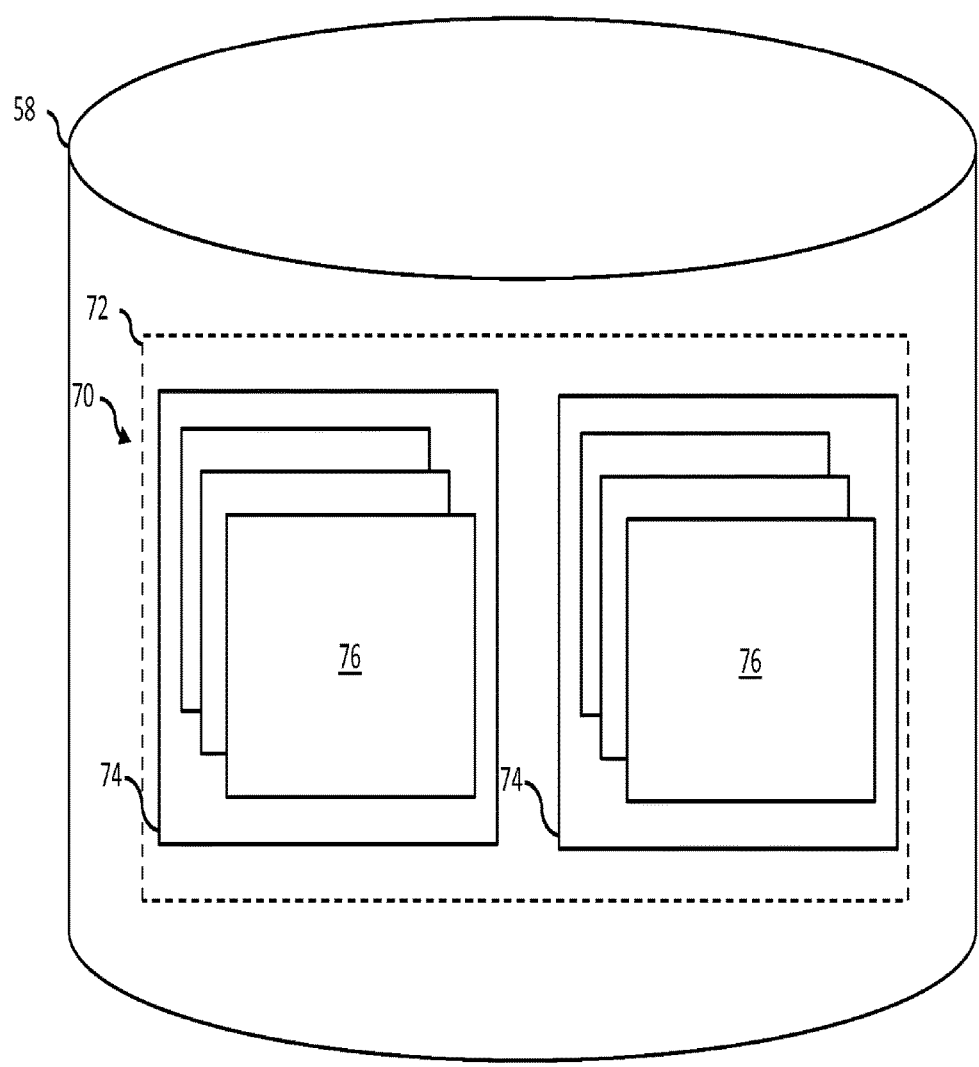
FIG. 5 schematically depicts a data store according to one or more embodiments shown and described.

Referring collectively to FIGS. 3 and 5, the data store 58 can comprise inventory information for providing data instances that correspond to products in inventory. In some embodiments, the inventory information can be provided as a hierarchical data type 70. Specifically, each data instance hierarchical data type 70 can be organized by a product category 72. The product category 72 can be utilized to identify a class of products. For example, when the inventory is related to fasteners, the product category 72 can correspond to a type of fastener such as, for example, hex cap screws, shoulder bolts, lag bolts, sheet metal screws, or the like. It is noted that the exemplary product categories provided herein are for clarity, and not intended to limit the embodiments described herein. It is furthermore noted that the product category 72 can comprise any useful notation for organizing products. Accordingly, the embodiments described herein can be applied to any type of product by extending the specific embodiments of the present disclosure.

Each product category 72 can apply to a plurality of product, instances 72. Each product instance 72 can be defined by attributes 76. For example, the product category 72 of hex cap screw can product instances 72 each having attributes 76 which further correspond to the product such as, for example, material, finish, length, diameter, price information, quantity in stock, or the like. Alternatively or additionally, the attributes 76 can comprise information for organizing the product instances 74 in a relational database or defining related products such as, but not limited to, relational parameters, attribute metadata, relational inheritance, or the like.

Referring collectively to FIGS. 2 and 3, the data store 58 can be provided to the client memory 24 of the inventory exchange client 20. For example, the communication module 56 can be configured to pull the data store 58 from the inventory exchange server 40. Alternatively or additionally, the API module 60 of the inventory exchange server 40 can push the data store 58 to the inventory exchange client 20. For example, the dynamic web page 12 can be launched by the asynchronous web portal 32 upon the inventory exchange client 20 for a first time, i.e., an initial use of the dynamic web page 12. Upon identifying the initial load, the asynchronous web portal 32 can pull the data store 58 from the relational data base 62 of the inventory exchange server 40. Specifically, the script module 52 can cause the API request module 54 to define a request query for the data store 58 that is executed by the communication module 56. The API module 60 can receive the request and launch the integration controller of the controller module 64, which can provide the data store 58 from the relational database 62. Accordingly, the data store can be received via the communication module 56 and stored on the client memory 24.

Upon the initial load, the inventory information of the data store 58 can be provided with an identifiable version of the inventory information. The inventory information can be the most recent identifiable version. Accordingly, the inventory information can be indicative of the current state of the product inventory that corresponds to the inventory information. Alternatively or additionally, the integration controller can be configured to manage the inventory information to maintain various identifiable versions of the inventory information and selectively provide the inventory information to the inventory exchange client 20.

According to the embodiments described herein, the integration controller of the controller module 64 can be configured to update the inventory information of the data store 58. In some embodiments, the inventory exchange server 40 can transmit updated inventory information via the server communication module 46. The inventory exchange client 20 can receive the updated inventory information via the client communication module 26. Specifically, each time the inventory exchange client 20 authenticates to the inventory exchange server 40 (e.g., signs in to the server), the integration controller can interrogate the identifiable version information of the inventory information of the data store 58. Should the identifiable version correspond to an undesired identifiable version, the inventory information can be updated. For example, out of date inventory information of the data store 58 can be updated to the most recent version of the inventory information of the relational database 62. In some embodiments, the integration controller can be configured to track the differences between versions of the inventory information. Accordingly, the data store 58 can be updated by providing delta data indicative of the difference between the version of the inventory information in the data store 58 and the desired version in the relational database 62.

Referring still to FIGS. 2, 3 and 5, the frontend controller of the controller module 64 can be configured to query resources of the inventory exchange client 20 via the API module 60. In some embodiments, the frontend controller can be configured to direct access of the dynamic web page 12 to the inventory information of the data store 58. For example, the frontend controller can direct the access according to access rules data associated with authentication information in the relational database 62. The authentication information can be associated with login credentials of an entity such as, for example, an individual, an organization (e.g., a distributor, an original equipment manufacturer, a wholesaler, an electrical contractor), or the like. Alternatively or additionally, the authentication information can be associated with a particular web portal hosted by the inventory exchange server 40. For example, a first web portal having a first Internet Web address may be configured for retail customers, while a second web portal having a second Internet Web address may be configured for distributors. Accordingly, each web portal can be associated with particular authentication information.

Accordingly, the frontend controller can determine the access rules data to apply according to the authentication information provided during authentication. In some embodiments, the access rules data can be configured to selectively present the inventory information depending upon entity. For example, a first type entity may be interested in viewing a first subset of products, while a second entity may be interested in viewing a second subset of products. Moreover, a supplier may wish to only present a certain subset of products to a specific type of entity, while preventing other types of entities from seeing the same subset of products. Thus, portions of the inventory information can be selectively hidden from access by the dynamic web page 12 of the inventory exchange client 20 based upon the authentication information. For example, the access rules data can define the product categories 72 available according to the authentication information.

According to the embodiments described herein, the access rules data can define attributes 76 available according to the authentication information. For example, the asynchronous web portal 32 can receive a request from the frontend controller to apply access rules data. Accordingly, the request can be encoded to indicate the access rules data. The asynchronous web portal 32 can provide price information to the dynamic web page 12 according to the access rules data. Thus, the access rules data can provide a first price information for a first type of entity, and a second price information for a second type of entity. Accordingly, price information can be provided based upon entity type. For example, the first price information can provide the price information, while the second price information can hide the price information. When the price information is hidden, the associated identification object can be encoded to indicate that the price information is hidden. For example, the identification object can provide text to indicate the price is unavailable (e.g., "call for price"), an image can be displayed, or the like. Alternatively or additionally, the first price information and the second price information can be different. Accordingly, differential pricing can be provided based upon entity type, i.e., a supplier can offer a discount to certain entities.

In some embodiments, the frontend controller of the controller module 64 can be configured to apply access rules data according to prior interactions between the inventory exchange client 20 and the inventory exchange server 40. Specifically, the frontend controller can track authentications of the inventory exchange client 20 to the inventory exchange server 40. The frontend controller can update the access rules data according to the authentications. Accordingly, the access rules data can be updated to include rules for adjusting the dynamic web page 12 based upon prior interactions. For example, if an entity previously purchased a certain product the access rules data may include a rule for presenting the same product as a suggestion via the dynamic web page 12.

Referring collectively to FIGS. 3-5, the frontend controller of the controller module 64 can be configured to communicate with the asynchronous web portal 32 to track the product grid 202. In some embodiments, the asynchronous web portal 32 can transmit grid data to the frontend controller. The grid data can be encoded to provide information sufficient to duplicate the product grid 202 such as, for example, the selected product category, the selection input, or any other information utilized to generate the product grid 202. Accordingly, the frontend controller can issue a request via the API module 60 to the asynchronous web portal 32 to reproduce the product grid 202 upon a subsequent load of the dynamic web page 200. In some embodiments, the identification objects of the product grid 202 corresponding to product instances having updated information can be encoded to indicate that the information has been updated since the last interaction. Alternatively or additionally, the frontend controller can be configured to communicate updated information from a prior product grid using alternative communication channels associated with the entity such as, for example, email, text message, or the like. Thus, the embodiments described herein can communicate product updates based upon previous interactions.

Referring collectively to FIGS. 2-4, the identification object of each cell 214 can be configured to receive save selection input. Accordingly, each of the identification objects can be provided as a control that accepts input indicative of a desire to save one or more product instances. In response to the save selection input, the asynchronous web portal 32 can communicate with the inventory exchange server 40 to associate the product instances with the entity according to the save selection input. For example, the request handler module 50 can process the save selection input and cause the script module 52 to request that the product instances be associated with the entity. The script module 52 can direct the API request module 54 to generate a query to resources of the inventory exchange server 40. Accordingly, the communication module 56 can transmit a save product request to the API module 60 of the inventory exchange server 40. The save product request can be encoded to associate the product instance with the authentication information of the entity, i.e., the save product request can be associated with the product instances and the authentication information.

The save product request can be received by the API module 60. The API module 60 can be configured to launch the frontend controller of the controller module 64 according to the save product request. In some embodiments, the frontend controller can associate the product instances with the authentication information in the relational database 62. Accordingly, the frontend controller can issue a request via the API module 60 to the asynchronous web portal 32 to provide notifications regarding updated information, e.g., attributes 76 (FIG. 5), of the saved product instances upon a subsequent load of the dynamic web page 200. Alternatively or additionally, the identification objects of the product grid 202 corresponding to the saved product instances can be encoded to indicate updates. Alternatively or additionally, the frontend controller can be configured to communicate updated information regarding the saved product instances using alternative communication channels associated with the entity.

It should now be understood that the embodiments described herein can utilize an asynchronous web portal to provide a dynamic web page that includes objects that can be updated asynchronously. Moreover, the asynchronous web portal can be implemented using a framework configured to handle requests for both client-side components and server-side components. Accordingly, the asynchronous web portal can update objects on the dynamic web page using client-side components, server-side components, or both. The use of client-side components can have particular advantages related to inventory management. For example, certain types of inventory, e.g., fasteners, electrical components, chemicals, sports products, computer products, building supply products, automotive products, clothing products, agricultural products, food, or any additional consumer product or business to business product category, can be provided with a plurality of attributes that are important for the selection of the product. Accordingly, in order to select the appropriate product, various attributes can impact the use and selection of the product. Thus, it may be desirable to provide the attributes in an interface for selecting or managing the products. However, such an interface can be difficult to interact with, due to an abundance of information.

Moreover, since each product can be associated with a plurality of relevant attributes, a large amount of data can be communicated. For example, when implementing a web page, the server may need to host a large amount of data for the client device, which can require a relatively large amount of time for page updates or generate unstable web pages. The asynchronous web portal described herein can be utilized to improve the effectiveness of managing attribute rich inventory. For example, by providing a data store on the client-side in an initial load or offline (i.e., via portable tangible storage medium), the speed, and effectiveness of the web page can be increased dramatically. Specifically, considering a data store of about 30 MB hosted on the server-side, a page refresh can require between about 15 seconds to about 5 minutes. When the same data store is provided client-side, a refresh of a dynamic object that accesses the data store can be assembled in milliseconds. Accordingly, the embodiments described herein can drastically improve the functioning of an e-commerce server, an e-commerce client, or both.

While particular embodiments have been illustrated and described herein, it should be understood that various other changes and modifications may be made without departing from the spirit and scope of the claimed subject matter. Moreover, although various aspects of the claimed subject matter have beers described herein, such aspects need not be utilized in combination. It is therefore intended that the appended claims cover all such changes and modifications that are within the scope of the claimed subject matter.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto."

What is claimed is:

1. A computer-implemented ecommerce purchase selection method that augments control and ease of ecommerce product selection across a plurality of products with a multitude of product characteristics comprising the steps of:
   initiating, on a first computing device that comprises:
      a memory,
      one or more processors,
      a display,
      a communication module, and
      one or more input devices;
   a first authentication attempt with an inventory exchange server, upon being authenticated, by the inventory exchange server, receiving, from the inventory exchange server;
      a portal, and
      a data store that comprises inventory information, wherein the inventory information comprises one or more product instances,
   initiating, by the portal, an interactive interface on the display,
   populating the interactive interface with identification objects,
      wherein the identification objects are associated with product instances of the inventory information, and
      wherein the identification objects comprise:
         an indicator of a selected product category,
         at least one of a product selection object,
         a product instance configuration that is configured with instances of first and second attributes,
            wherein the product instance configuration is scaled to be constrained within the display, without requiring additional navigation tools to capture all instances of the first and second attributes and
            wherein configured instances within the product instance configuration are encoded to indicate availability of the products in an inventory related to the inventory exchange server; and
      further wherein the interaction with the interactive interface further comprises one of at least:
         a change of product category, and
         a change of either or both of first and second attributes,
            whereupon if the input is a change of product category or a change of either or both of first and second attributes, the product instance configuration is reconfigured with instances of the changes of product category, first attribute and second attribute, and the reconfigured product instance configuration remains constrained within the display, without requiring additional navigation tools to capture all instances of the first and second attributes:
   receiving, on the first computing device, input, from the one or more input devices, that is an interaction with the interactive interface, via one of the identification objects, wherein the interaction is at least one or more purchase selection inputs that is indicative of selection of the product instance, encoding, by the portal, a product order request to initiate a product transaction according to the input comprising the one or more purchase selection inputs; and transmitting, by the first computing device, the product order request to the inventory exchange server.

2. The method of claim 1, wherein the product instance configuration is a grid.

3. The method of claim 1, wherein the data for the product instances is a hierarchical data type and is defined by attributes; and the identification objects are organized according to the attributes of the associated product instances.

4. The method of claim 3, wherein during the method an update to product instances at the inventory exchange server occurs, further steps comprising updating, by the inventory exchange server, of product instances, pushing, by the inventory exchange server, the updated product instances to the data store at the first computing device, and dynamically updating the interactive interface by updating only those identification objects that are related to the updated product instances and that identification objects not related to the updated product instances remain static.

5. The method of claim 1, wherein the being authenticated includes the step of setting access rules that selectively provide, from the inventory exchange server, versions of data based on a predetermined rule set, and associating the authentication with an entity using the first computing device.

6. The method of claim 5, further comprising the steps of receiving, by the first computing device, an indication that a save selection of product instance is to be logged, generating, by the first computing device, a save selection input that is indicative of a save selection of the product instance, storing, in the data store, the save selection, encoding a save product request to associate the save selection with authentication information of an entity; and transmitting the save product request to the inventory exchange server.

7. The method of claim 5, further comprising the steps of initiating, on the first computing device, a second authentication attempt with the inventory exchange server, upon authentication, accessing, by the portal, an updated version of the data store on a server memory of the inventory exchange server, wherein the updated version of the data store comprises an updated version of inventory information that corresponds to products in inventory; and selectively updating, at least in part by the portal, the version of the data store stored on the first computing device wherein the product instance is updated to reflect products in the inventory as indicated on the inventory exchange server.

8. The method of claim 7, further comprising the steps of receiving, by a registered entity from the inventory exchange server, wherein authentication provides a registering of the entity with the inventory exchange server, an electronic message that selected product instances have been updated on the inventory exchange server, wherein a generation of the electronic message is controlled by the predetermined rule set.

9. The method of claim 7, wherein the selectively updating is further controlled, by the inventory exchange server, at least in part by the predetermined rules set associated with the entity.

10. A system that augments control and ease of ecommerce product selection across a plurality of products with a multitude of product characteristics comprising:

a first computing device that comprises:
  a memory,
  one or more processors,
  a display,
  a communication module, and
  one or more input devices:
a first authentication attempt with an inventory exchange server, upon being authenticated, by the inventory exchange server, receiving, from the inventory exchange server:
  a portal, and
  a data store that comprises inventory information, wherein the inventory information comprises one or more product instances,
initiating, by the portal, an interactive interface on the display,
populating the interactive interface with identification objects,
  wherein the identification objects are associated with product instances of the inventory information, and
  wherein the identification objects comprise:
    an indicator of a selected product category,
    at least one of a product selection object,
    a product instance configuration that is configured with instances of first and second attributes,
      wherein the product instance configuration is scaled to be constrained within the display, without requiring additional navigation tools to capture all instances of the first and second attributes and
      wherein configured instances within the product instance configuration are encoded to indicate availability of the products in an inventory related to the inventory exchange server; and
  further wherein the interaction with the interactive interface further comprises one of at least:
    a change of product category, and
    a change of either or both of first and second attributes,
      whereupon if the input is a change of product category or a change of either or both of first and second attributes, the product instance configuration is reconfigured with instances of the changes of product category, first attribute and second attribute, and the reconfigured product instance configuration remains constrained within the display, without requiring additional navigation tools to capture all instances of the first and second attributes;
receiving, on the first computing device, input, from the one or more input devices, that is an interaction with the interactive interface, via one of the identification objects,
  wherein the interaction is at least one or more purchase selection inputs that is indicative of selection of the product instance,
encoding, by the portal, a product order request to initiate a product transaction according to the input comprising the one or more purchase selection inputs; and transmitting, by the first computing device, the product order request to the inventory exchange server.

11. The system of claim 10, wherein the product instance configuration is a grid.

12. The system of claim 10, wherein the product instances is comprised of data that is of a hierarchical data type and is defined by attributes; and the identification objects are organized according to the attributes of the associated product instances.

13. The system of claim 12, wherein the inventory exchange server updates product instances and
pushes the updated product instances to the data store at the first computing device, and
dynamically updates the interactive interface by updating only those identification objects that are related to the updated product instances and that identification objects not related to the updated product instances remain static.

14. The system of claim 10, wherein the being authenticated includes the step of setting access rules that selectively provide, from the inventory exchange server, versions of data based on a predetermined rule set, and associating the authentication with an entity using the first computing device.

15. The system of claim 14, wherein the first computing device is configured to:
generate a save selection input that is indicative of a save selection of the product instance,
store, in the data store, the save selection,
encode a save product request to associate the save selection with authentication information of an entity; and
transmit the save product request to the inventory exchange server that associates the save selection with the authentication information of the associated entity.

16. The system of claim 14, wherein the first computing device is configured to
Initiate a second authentication attempt with the inventory exchange server,
upon authentication, access, by the portal, an updated version of the data store on a server memory of the inventory exchange server, wherein the updated version of the data store comprises an updated version of inventory information that corresponds to products in inventory; and
selectively update, at least in part by the portal, the version of the data store stored on the first computing device wherein the product instance is updated to reflect products in the inventory as indicated on the inventory exchange server.

17. A non-transitory computer-readable storage device that stores executable instructions that, in response to execution, cause a system comprising a processor to perform operations, comprising:
initiating, on a first computing device that comprises:
a memory,
one or more processors,
a display,
a communication module, and
one or more input devices;
a first authentication attempt with an inventory exchange server,
upon being authenticated, by the inventory exchange server, receiving, from the inventory exchange server:
a portal, and
a data store that comprises inventory information, wherein the inventory information comprises one or more product instances,
initiating, by the portal, an interactive interface on the display,
populating the interactive interface with identification objects,
wherein the identification objects are associated with product instances of the inventory information, and
receiving, on the first computing device, input, from the one or more input devices, that is an interaction with the interactive interface, via one of the identification objects,
wherein the interaction is at least one or more purchase selection inputs that is indicative of selection of the product instance,
encoding, by the portal, a product order request to initiate a product transaction according to the input comprising the one or more purchase selection inputs;
transmitting, by the first computing device, the product order request to the inventory exchange server;
wherein the identification objects comprise:
an indicator of a selected product category,
at least one of a product selection object,
a product instance configuration that is configured with instances of first and second attributes,
wherein the product instance configuration is scaled to be constrained within the display, without requiring additional navigation tools to capture all instances of the first and second attributes and
wherein configured instances within the product instance configuration are encoded to indicate availability of the products in an inventory related to the inventory exchange server; and
further wherein the interaction with the interactive interface further comprises one of at least:
a change of product category, and
a change of either or both of first and second attributes,
whereupon if the input is a change of product category or a change of either or both of first and second attributes, the product instance configuration is reconfigured with instances of the changes of product category, first attribute and second attribute, and the reconfigured product instance configuration remains constrained within the display, without requiring additional navigation tools to capture all instances of the first and second attributes.

* * * * *